United States Patent [19]
Edmunds

[11] 3,774,400
[45] Nov. 27, 1973

[54] CHARGING PRESSURE CONTROL FOR FLUID UNIT

[75] Inventor: John O. Edmunds, Indianapolis, Ind.

[73] Assignee: General Motors Corporation, Detroit, Mich.

[22] Filed: Apr. 19, 1972

[21] Appl. No.: 245,561

[52] U.S. Cl.................. 60/358, 60/360, 60/DIG. 5, 60/905
[51] Int. Cl............................................ F16h 41/20
[58] Field of Search........................ 60/12, 337, 347, 60/357, 358, 360, DIG. 5; 74/66 A

[56] References Cited
UNITED STATES PATENTS
3,255,590  6/1966  Tipping et al..................... 60/337 X
3,358,444  12/1967  Tuck................................. 60/347 X Primary Examiner—Edgar W. Geoghegan
Attorney—W. E. Finken et al.

[57] ABSTRACT

In the preferred embodiment compressor discharge pressure from a gas turbine engine produces a signal which is employed to vary the supply of working fluid from a charging pressure control valve to a fluid coupling. Flow of working fluid to the coupling is proportional to engine power output so that the torque transmitting capacity of the unit is progressively increased or decreased as engine power is progressively increased or decreased.

7 Claims, 4 Drawing Figures

Patented Nov. 27, 1973

3,774,400

3,774,400

CHARGING PRESSURE CONTROL FOR FLUID UNIT

This invention relates to power tranmission controls and more particularly to a charging pressure control for fluid units which controls and regulates the supply of working fluid to the unit to effect a change in the capacity of the fluid unit in accordance with engine operating conditions.

Hydrodynamic torque converters and fluid coupling units have been employed between engine and geared change-speed transmission installations to smoothly transmit engine power and to absorb drive line shocks. While such units serve as a hydraulic clutch to isolate the engine and transmission they generally transmit engine power at low engine power settings. Thus, when the engine is at an idle condition some power is absorbed by the fluid unit and transmitted into the transmission. Such torque transmittal is undesirable particularly when a major accessory such as a winch or bucket is to be driven by the engine at low power settings. With both the fluid unit and the accessory absorbing engine power the load on the engine could become excessively great requiring a further increase in engine power to prevent an engine stall situation. Such an increase in power to meet requirements results in increased power absorption by the fluid unit. The power absorption by the fluid unit is often excessive particularly where the vehicle is stationary. Under such conditions there is increased fuel consumption as well as additional wear on the engine, the fluid unit and the transmission.

Prior to the present invention there have been many devices such as special clutches between the engine and fluid unit as well as dump and fill controls for the fluid unit to disconnect the engine and the change speed transmission. Also variable capacity devices have been employed to control the torque transmitting capability of the fluid unit. These devices while solving many of the problems of apportioning power often require complex and costly controls and have not been widely employed in commercial application.

In this invention there is a new and improved fluid unit control in which the charging pressure of the fluid unit is selectively reduced to zero to reduce the capacity of the engine coupling to approach zero under predetermined low power engine operation. This means that the power turbine in the case of a gas turbine engine is effectively disconnected from the transmission during low power engine operation so that all of the engine power developed under low and part throttle condition may be directed to drive accessories without dissipation of power by the fluid unit. As engine power output is increased the charging pressure is proportionally increased and regulated to increase the capacity of the fluid unit.

In the preferred embodiment of this invention a special control valve is employed for controlling the charging pressure directed to a hydraulic coupling operatively connected to a gas turbine engine. This control valve provides for minimum flow of working fluid to the fluid unit under idle conditions so that the fluid unit will evacuate itself and have zero capacity for vehicle drive. Under such conditions all power developed by the engine will be available for accessory operation being transmitted through a power path in parallel with the fluid unit. Under increased engine power conditions where power is made available for vehicle drive the capacity of the coupling will be automatically increased by the supply of an increased quantity of fluid to the coupling from the control valve.

The charging pressure control valve is acted on by a variable modulator pressure which is inversely proportional to the compressor discharge pressure of the gas turbine engine. At idle and low power operations compressor discharge pressure is low but the modulator pressure is high to exert a force on the control valve so that flow into the coupling is minimal to provide for a small capacity fluid unit. With the increase in engine power the modulator force decreases and the control valve provides for regulated high pressure flow of operating fluid to the coupling so that its capacity is accordingly increased for transmission operation.

It is an object, feature and advantage of this invention to provide a new and improved charging pressure control valve for an engine driven fluid unit which feeds operating fluid to the unit to progressively and automatically vary its capacity in accordance with engine power output so that there is low capacity at low power operation and progressively increased capacity for progressively increasing high power operations.

Another object, feature and advantage of this invention is to provide a new and improved charging pressure control for fluid coupling and torque converter units in which the fluid supplied to the unit is in accordance with engine operating conditions; the control provides for the supply of zero or a minimal flow to the fluid unit when the engine power is low and the progressive increase of flow to a maximum engine power is progressively increased to maximum power.

Another object, feature and advantage of this invention is to provide a new and improved charging pressure control for fluid units driven by a gas turbine engine in which a flow control valve is acted on by a modulated pressure inversely proportional to the compressor discharge pressure of the engine to effect the low flow of operating fluid into the unit under low engine power conditions which flow progressively increases as the engine power is progressively increased toward a maximum power.

Another object, feature and advantage of this invention is to provide a variable capacity torque transmitting system incorporating an accessory drive and a separate vehicle drive. The vehicle drive has a hydrodynamic unit which continuously acts to pump itself free of oil when the inflow is less than the outflow and in which there is a new and improved fluid unit feed control valve that modulates the inflow of fluid to the fluid unit so that the unit capacity can be modified between maximum to zero capacity in accordance with engine power output.

Another object, feature and advantage of this invention is to provide a variable capacity torque transmitting system incorporating a hydrodynamic fluid coupling driven by a gas turbine engine in which the unit continuously acts to pump itself free of oil except when the inflow, outflow and coupling pumping ability are all in equilibrium and in which there is a pressure regulating flow control valve located in the line between the coupling feed port and the main regulating valve which supplies operating fluid to the coupling at inlet pressures varied in accordance with gas turbine engine power so that the coupling will receive minimum flow during engine idle conditions for low capacity and progressively increasing quantities of fluid as the engine power is increased to maximum power so that the torque capacity of the coupling will be proportionally increased to maximum capacity.

These and other objects, features and advantages of the invention will become more apparent from the following detailed description and drawing in which.

Figure 1:
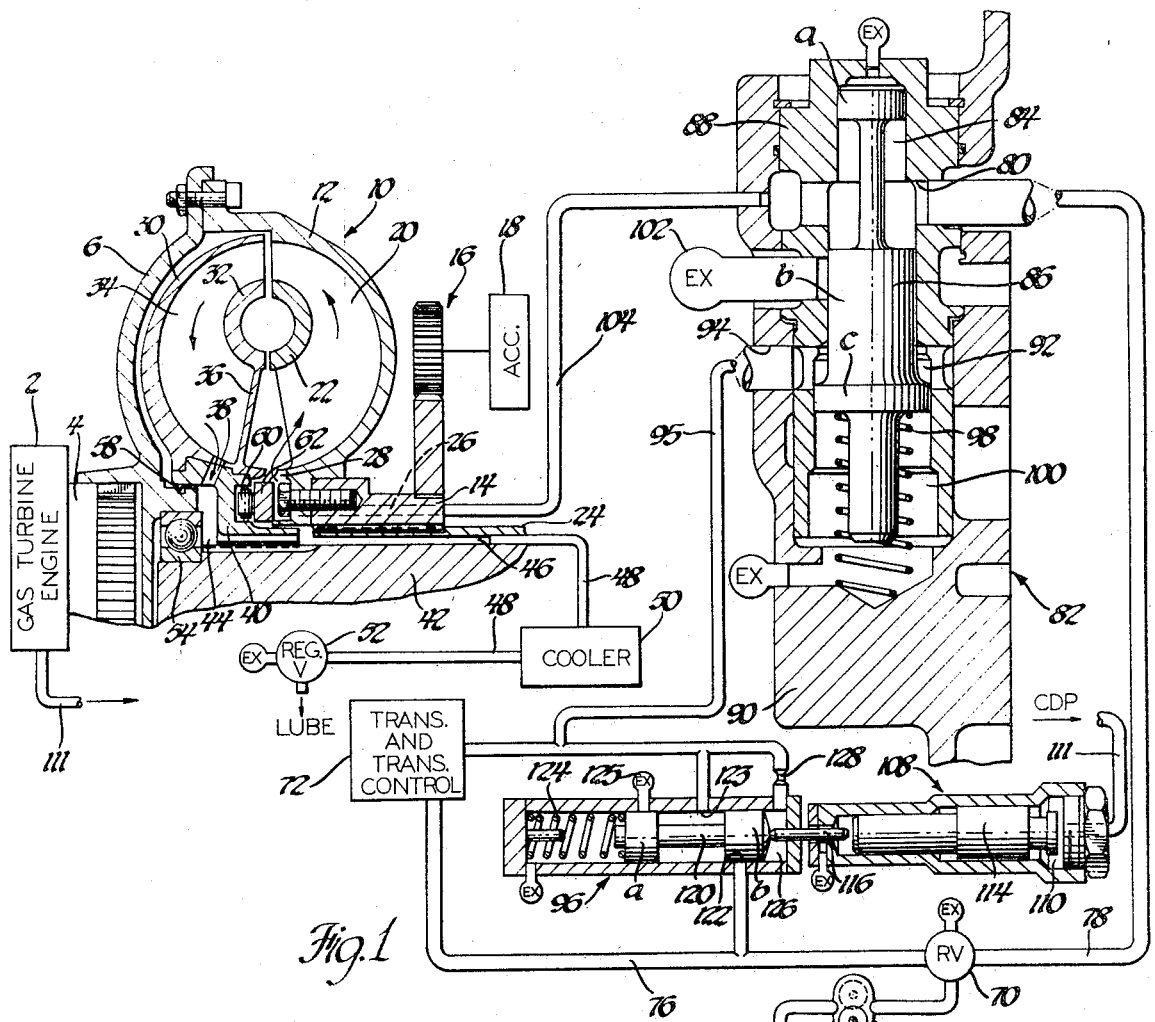
FIG. 1 is a diagrammatic layout of a preferred embodiment of this invention featuring a variable capacity fluid coupling and the hydraulic controls therefor.

In FIG. 1 there is shown a gas turbine engine 2 which has a rotatable output shaft 4 that is drivingly connected to the rotatable front cover 6 of a fluid unit here disclosed as a coupling 10. This coupling has provision for self-evacuation as disclosed in copending U.S. application Pat. Ser. No. 191,604 for Fluid Unit with Dump and Fill Control filed Oct. 22, 1971, now U.S. Pat. No. 3,724,209. The front cover of the coupling 10 is secured to a rotatable housing 12 which is drivingly connected to a cylindrical sleeve 14. This sleeve drives power takeoff gearing 16 which in turn drives a major accessory 18, such as a winch or bucket, capable of absorbing a large portion of engine power.

The coupling has a plurality of blades 20 secured in an annular side-by-side relationship to the interior of the housing 12 and to an inner shell 22 to form a bladed pump assembly. With this construction, the pump assembly has a plurality of separate fluid directing passages each with a fluid entrance and exit opening. The cylindrical support sleeve 14 driven by the housing 12 drives a sleeve shaft 24 and is provided with an oil supply passage 26 that feeds transmission oil to the coupling inlet 28 and into the entrance openings of the fluid passages of the pump assembly, Disposed in front of the pump assembly is a rotatable turbine assembly having outer and inner shells 30 and 32 which are connected by a plurality of blades 34 arranged in a side-by-side relationship in an annular pattern about the rotational axis of the coupling to form a plurality of fluid directing passages therebetween. The majority of these passages have unrestricted exit openings for directing fluid exiting from the turbine into the entrance openings of the pump assembly while the remainder, three of 36 for example, are provided with blocking walls 36 formed at the exit thereof for diverting fluid into radial openings 38 formed in the outer shell 30 and in a connected annular hub 40 splined to the end of a torque transmitting shaft 42 that drives the change speed gearing of the transmission used for vehicle propulsion.

Fluid exiting from radial openings 38 is directed by a longitudinal passage 44 formed in the hub 40 to a discharge passage 46 provided between the sleeve shaft 24 and the main torque transmitting shaft 42. The discharge passage 46 is connected by line 48 to an oil cooler 50 and then to a lubrication pressure regulator valve 52 which feeds lubrication oil to the transmission. Suitable anti-friction bearings 54 are disposed between a centralized and inwardly extending shoulder of the front cover 6 and the end of the shaft 42 to provide for the support and the relative rotation of these elements. Supported on the outer periphery of the shoulder and concentric with the bearing 54 is an annular fluid seal 58 which contacts the inner annular projecting surface of hub 40 of the turbine to block the discharge of fluid from the space between the front cover 6 and the outer shell 30 of the turbine into the discharge passages 44 and 46. The hub 40 of the turbine supports a plurality of thrust rollers 60 disposed in a ring which contacts an annular race 62 supported by the hub of the pump assembly.

In normal operation with the coupling operating at full capacity, a high flow of pressurized oil is fed into the coupling torus provided by the pump and turbine assemblies through the supply passage 26 and inlet 28 shown by the flow arrows in FIG. 1. As the pump is driven the oil circulates in a rotary and vortex flow path within the torus and the oil in the passages provided with blocking walls 36 is discharged through the openings 38 into discharge passages 44 and 46. Since the quantity of oil supplied to the supply passage 26 is equal to the flow capacity of the coupling discharge passages the coupling cannot evacuate itself. The seal 58 prevents the oil from recirculating back into the coupling torus. In this operation engine power is high and inlet flow and outlet flow are equal to maintain the coupling in a filled state. To progressively decrease the capacity of the coupling the oil flow into the coupling is progressively reduced so that it will gradually discharge the oil to reduce the torque absorption capacity of the coupling.

In this invention special valve means are provided to control the supply of oil to the coupling in accordance with engine power output. In FIG. 1 there is a fluid pump 66 which pumps transmission oil from sump 68 to a pressure regulator valve 70. This valve produces a regulated pressure for hydraulically operated controls of change speed transmission 72 through a main line 76 and further produces a primary overage which is employed for feeding and coupling 10. The primary overage is connected by line 78 to inlet port 80 of a capacity or coupling charging pressure control valve 82. This port communicates with a chamber 84 in the valve provided between lands $a$ and $b$ of a valve element 86 which is disposed for longitudinal movement in a sleeve 88 inserted in the valve body 90. The valve element 86 also has a large diameter land $c$ which forms a control chamber 92 that is connected by port 94 and passage 95 to a modulator pressure regulator valve 96 which will be later described. The bottom edge of land $c$ provides a contact surface for helical spring 98 operatively disposed in the spring pocket 100.

The capacity control valve 82 has an exhaust port 102 which cooperates with the upper edge of land $b$ to control the pressure in chamber 84 that is supplied to the coupling 10 through a coupling feed passage 104 which is connected into the passage 26. If the pressure in chamber 84 exerts a force on the area differential of lands $a$ and $b$ that exceeds the force of spring 98, the valve element 86 will be moved downwardly to open chamber 84 to exhaust 102 until the pressure in the chamber 84 is sufficiently reduced to allow the spring to move valve element 86 upwardly so that land $b$ covers the exhaust port 102. By uncovering and covering this exhaust port the valve 82 regulates a variable supply pressure to coupling 10. In addition to the opposing forces of pressure in chamber 84 and the spring 98, the flow of oil supplied to the coupling 10 is further determined by the variable force of a pressure supplied to chamber 92 which reflects engine operation and which urges the valve element downwardly to open exhaust 102 to reduce the flow of fluid supplied to coupling 10.

This control provides for the feed of the coupling to be automatically matched with the power output of the engine 2. In the preferred embodiment of this invention there is a compressor discharge modulator valve 108 having an end chamber 110 operatively connected with the compressor discharge passage of the engine 2 by a passage 111. The pressure of the discharge gasses from the compressor exerts a force on a valve element 114 of the compressor discharge modulator valve urging it to the left against a shiftable force transmitting pin 116. Pin 116 extends into the modulator pressure regulator valve 96. The modulator pressure regulator valve has a shiftable valve element 120 with an inlet port 122 that communicates with the main line 76 and has an outlet port 123 that communicates with line 95 that feeds to the chamber 92 of control valve 82.

One end of the shiftable valve element 120 is contacted by the pin 116 extending from the compressor discharge pressure modulator 108 while the other end engages a pressure regulating spring 124. The valve element is formed with lands *a* and *b* which control the ports for exhaust 125 and the inlet port 122 connected to the main pressure line 76. Modulator pressure is fed into an end chamber 126 through flow control restriction 128 so that modulator pressure also urges the valve element against the opposing force of spring 124. This valve provides a signal, inversely proportional to the compressor discharge pressure, which is fed through an outlet port to the modulator pressure line 95 and thus to the coupling charging pressure control valve 82.

In addition to feeding the control valve 82 with a control pressure reflecting engine operation, the modulator pressure regulator valve 96 supplies a pressure to the transmission control 72 such as disclosed in U.S. Pat. No. 3,587,355 issued June 28, 1971 to R. H. Schaefer for use in controlling shift signal valves.

Figure 2:
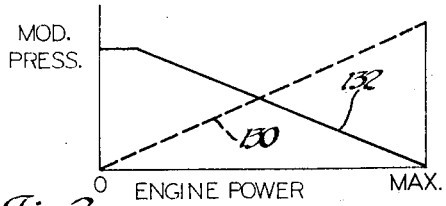
FIG. 2 is a graph of engine power versus compressor discharge pressure and versus modulator pressure.
Figure 3:
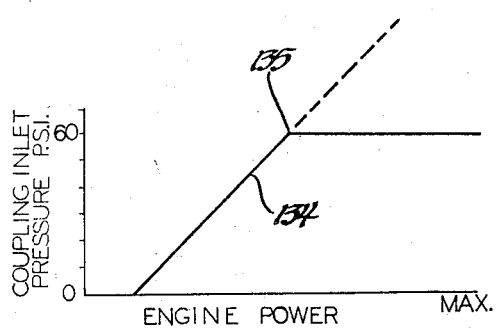

FIG. 2 discloses the operation of the compressor discharge pressure modulator and the modulator pressure regulator valve. As shown by the dashed line curve 130 the compressor discharge pressure progressively increases as gas turbine engine power is increased. Thus when engine power is increasing, a progressively increased force is transmitted through pin 116 to the valve element 120 of the modulator pressure regulator valve urging it to the left so that the chamber between lands *a* and *b* fed with oil from the main line is open to exhaust to reduce the pressure in the modulator pressure line 95. When this occurs the pressure in chamber 126 drops so that valve element is moved back to cover the exhaust port until compressor discharge pressure is further increased. This gradual reduction in modulator pressure as engine power increases is shown by the full line curve 132. As shown, at full power, there is no pressure in the modulator line while at zero power there is maximum pressure. Thus the modulator pressure fed to the chamber 92 provides a variable force proportional to engine power urging the valve element 86 of the coupling charging control valve 82 downwardly to reduce the supply of oil to the coupling 10. As engine power is increased, the variable force produced on the coupling charging valve by the modulator pressure valve progressively increases so that the spring 98 can urge the valve element 86 upwards to increase the supply of fluid to the coupling. This increasing supply is shown by the curve 134 in FIG. 3 in which the force on the coupling charging control valve exerted by the modulator pressure regulator is progressively decreased as the engine speed increases. At point 135 the inlet pressure reaches a maximum pressure of 60 psi because of limitations in the system such as regulator valve 52 exhausting to the sump.

Figure 4:
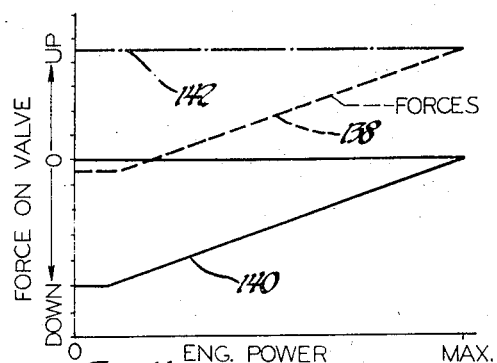
FIGS. 3 and 4 are graphs showing operation of the charging pressure control valve controlling the supply of fluid to the coupling.

FIG. 4 shows by curve 138 the sum of forces acting on the valve element 86. At zero engine power the modulator pressure is high as shown by curve 140. This force plus the charging force on the differential area in chamber 84 is greater than the force of spring 98 illustrated by curve 142 so that the valve is biased downwardly opening exhaust 102 to reduce or eliminate the charging flow to the coupling. Thus at closed throttle the coupling inlet pressure is zero. As the engine power is increased the sum of the forces on the valve causes it to move upwardly. Under these conditions coupling inlet pressure is gradually increased so that the coupling is fed with an increasing quantity of operating oil to progressively increase the torque transmitting capacity of the coupling. As engine power is dropped off the quantity of fluid or oil fed to the coupling is progressively decreased to progressively decrease the capacity of the oil fed to the coupling. Thus with this invention the capacity of the coupling is matched with the engine output to provide the apportioning of power in accordance with engine output.

The above description of a preferred embodiment of the invention is for illustration purposes only and other embodiments will now become readily apparent. The scope of this invention is therefore set forth in the following claims:

I claim:

1. In a variable capacity torque transmission a hydrodynamic torque transmitting unit for transmitting torque from an engine, a source of fluid pressure operatively connected to said unit, first control valve means operatively connected between said source and said unit for controlling the supply of fluid to said unit, second control valve means operatively connected to said first control valve means and to the engine to provide a force effective on said first control valve means to cause said first control valve means to automatically regulate a feed pressure to said unit in accordance with engine operating conditions so that said unit will be supplied with a low feed pressure at predetermined low engine power and progressively increasing feed pressures as engine power progressively increases to thereby increase the capacity of said unit in accordance with engine power output.

2. A variable capacity torque transmitting system comprising an engine having engine output means, a hydrodynamic torque transmitting unit operatively connected to said engine output means for transmitting engine torque, said torque transmitting unit having means to pump itself free of working fluid supplied thereto, an accessory capable of absorbing a part of the power developed by said engine, power take-off means drivingly connecting said engine to said accessory, a source of fluid pressure, control valve means hydraulically connected to said source and to said fluid unit and operatively connected to said engine to control the supply of fluid to said unit in accordance with engine operating conditions so that said unit will have a fluid flow supplied thereto to provide for a minimum capacity when engine power output is low and which flow progressively increases as the engine power output progressively increases to provide progressively increasing capacity.

3. The variable capacity torque transmitting system defined in claim 2 wherein said hydrodynamic torque transmitting unit is a fluid coupling, said engine being a gas turbine engine providing a compressor discharge pressure, valve means operatively connected to said gas turbine engine and to said control valve means for converting said compressor discharge pressure into a force effective on said control valve means to cause said control valve means to restrict the supply of fluid to said coupling when said gas turbine engine is operating in a low power mode and to progressively decrease said force applied to said control valve means as the power output of said gas turbine increases so that said control valve means provides an increasing supply of fluid to said coupling so that the capacity of said coupling progressively increases.

4. A variable capacity torque transmitting system comprising an engine having engine output means, a hydrodynamic torque transmitting unit operatively connected to said engine output means for transmitting torque supplied thereto, said torque transmitting unit having means therein to pump itself free of operating fluid supplied thereto, an accessory capable of absorbing a large part of the power developed by said engine, power take-off means drivingly connecting said engine to said accessory, a source of fluid pressure, control valve means hydraulically connected to said source and to said fluid unit and operatively connected to said engine to provide a reduced supply of operating fluid to said unit when the power developed by said engine is at a minimum power level and to provide a progressively increasing supply of operating fluid to said unit as said engine power increases from the minimum power level to a maximum power level to progressively increase the capacity of said unit to transmit engine power.

5. A variable capacity torque transmitting system comprising an engine, a hydrodynamic torque transmitting unit operatively connected to said engine for transmitting torque supplied thereto from said engine, said torque-transmitting unit having means therein to pump itself free of operating fluid supplied thereto, an accessory capable of absorbing a portion of the power developed by said engine, power transmitting means operatively connecting said engine to said accessory for driving said accessory, a source of fluid pressure, control valve means hydraulically connected to said source and to said fluid unit and operatively connected to the engine for controlling the supply of fluid from said source to said unit in accordance with engine operating conditions so that said unit receives minimal flow when the engine develops low power and increasing flow as the power developed by said engine increases toward maximum power to progressively increase the torque transmitting capacity of said unit from a minimum to a maximum capacity.

6. A torque transmitting system for transmitting torque from an engine in accordance with engine operating characteristics comprising an engine having output means, a hydrodynamic torque transmitting unit operatively connected to the engine output means for transmitting engine torque supplied thereto, said torque transmitting unit having means to pump itself free of operating fluid supplied thereto when furnished in any quantity less than the normal discharge of said unit, a transmission operatively connected to said torque transmitting unit for vehicle drive, an accessory capable of absorbing a major portion of the power developed by said engine, power take-off means separate from said transmission drivingly connecting said engine to said accessory, a source of fluid pressure, control valve means hydraulically connected to said source and to said torque-transmitting unit and operatively connected to the engine to control the supply of fluid to said torque transmitting unit in accordance with engine operating conditions so that said torque transmitting unit will have an inlet flow providing a minimum capacity unit when the output of said engine is low so that said accessory can be operated at low engine speeds without stalling said engine and so that said torque transmitting unit will be provided with an inlet flow which progressively increases as the engine output increases to increase the capacity of said torque transmitting unit for vehicle drive.

7. A vehicle drive system for transmitting torque from an engine in accordance with engine operating characteristics comprising an engine having output means, a hydrodynamic torque transmitting unit operatively connected to said engine output means for transmitting engine torque supplied thereto, said torque transmitting unit having means to pump itself free of operating fluid supplied thereto when furnished in any quantity less than the normal discharge of said unit, a transmission for vehicle propulsion operatively connected to said torque transmitting unit, an accessory capable of absorbing a large part of the power developed by said engine, power take-off means disposed in parallel with said torque transmitting unit and said transmission drivingly connecting said engine to said accessory, a source of fluid pressure, control valve means hydraulically connected to said source and to said torque transmitting unit and operatively connected to the engine to control the supply of fluid to said torque transmitting unit in accordance with engine operating conditions so that said torque transmitting unit will be supplied with a low regulated pressure providing a minimum capacity when the output of said engine is low to reduce power absorption by said torque transmitting unit so that said accessory can be operated at low engine speeds without stalling said engine and be supplied with increasing regulated pressure as said engine output increases to progressively increase the capacity of said torque transmitting unit for combined vehicle and accessory drive.

* * * * *

PO-1050
(5/69)

UNITED STATES PATENT OFFICE
CERTIFICATE OF CORRECTION

Patent No. 3,774,400          Dated November 27, 1973

Inventor(s) John O. Edmunds

It is certified that error appears in the above-identified patent and that said Letters Patent are hereby corrected as shown below:

Column 3, line 37, after "assembly" the comma should be a period; line 54, delete "longitudinal". Column 4, line 23, after "coupling" insert a comma; line 24, delete "it" and insert -- the coupling --; line 25, after "the" (first occurrence) insert -- working --; lines 25 and 26, delete "to reduce the torque absorption capacity of the coupling" and insert therefor -- therefrom for corresponding reduction of its torque transmitting capability --.

Signed and sealed this 15th day of October 1974.

(SEAL)
Attest:

McCOY M. GIBSON JR.          C. MARSHALL DANN
Attesting Officer              Commissioner of Patents